(12) United States Patent
Huang et al.

(10) Patent No.: US 9,478,919 B1
(45) Date of Patent: Oct. 25, 2016

(54) CONNECTION DETECTION SYSTEM AND DETECTION DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Kai-Long Huang, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/716,144

(22) Filed: May 19, 2015

(30) Foreign Application Priority Data

Apr. 17, 2015 (CN) .......................... 2015 1 0183287

(51) Int. Cl.
*G08B 21/00* (2006.01)
*H01R 13/66* (2006.01)
*H01R 13/717* (2006.01)
*H01R 13/70* (2006.01)

(52) U.S. Cl.
CPC .......... *H01R 13/6691* (2013.01); *H01R 13/70* (2013.01); *H01R 13/7175* (2013.01)

(58) Field of Classification Search
CPC .......... H01R 13/6691; H01R 13/7175; H01R 13/70
USPC .......................... 340/687; 710/302; 348/181
See application file for complete search history.

(56) References Cited

U.S. PATENT DOCUMENTS

| | | | |
|---|---|---|---|
| 6,337,633 B1* | 1/2002 | Foseide | G08B 13/1418 340/540 |
| 7,352,289 B1* | 4/2008 | Harris | H04Q 9/00 324/500 |
| 9,232,265 B2* | 1/2016 | Maxwell | H04L 12/12 |
| 9,258,602 B2* | 2/2016 | Kabuto | G09G 5/006 |
| 2008/0270635 A1* | 10/2008 | Nakahama | G09G 5/006 710/8 |
| 2009/0150589 A1* | 6/2009 | Watarai | G06F 13/4081 710/302 |
| 2012/0212626 A1* | 8/2012 | Canova | H04N 17/04 348/181 |

\* cited by examiner

*Primary Examiner* — Tanmay Shah
(74) *Attorney, Agent, or Firm* — Zhigang Ma

(57) ABSTRACT

A detection device detects the integrity of a connection between respective connectors of two devices. The detection device includes a control chip, an electronic switch, and an alarm member. The control chip is connected to the alarm member through the electronic switch. When the detection device works, the control chip is connected to the detection pin of the first connector. When the first connector is properly connected to the second connector, the detection pin outputs a first signal to the control chip causing the electronic switch to be off. When the first connector is connected with the second connector improperly, the detection pin outputs a second signal and the control chip turns on the electronic switch, sounding an alarm.

14 Claims, 5 Drawing Sheets

CONNECTION DETECTION SYSTEM AND DETECTION DEVICE

FIELD

The subject matter herein generally relates to a connection detection system and a detection device.

BACKGROUND

HDMI (High Definition Multimedia Interface) is a display interface and is widely used for a computer or a smart TV. However, if a HDMI of a display is connected to a HDMI of a motherboard improperly, the display will appear black screen.

BRIEF DESCRIPTION OF THE DRAWINGS

Implementations of the present technology will now be described, by way of example only, with reference to the attached figures.

DETAILED DESCRIPTION

Figure 1:
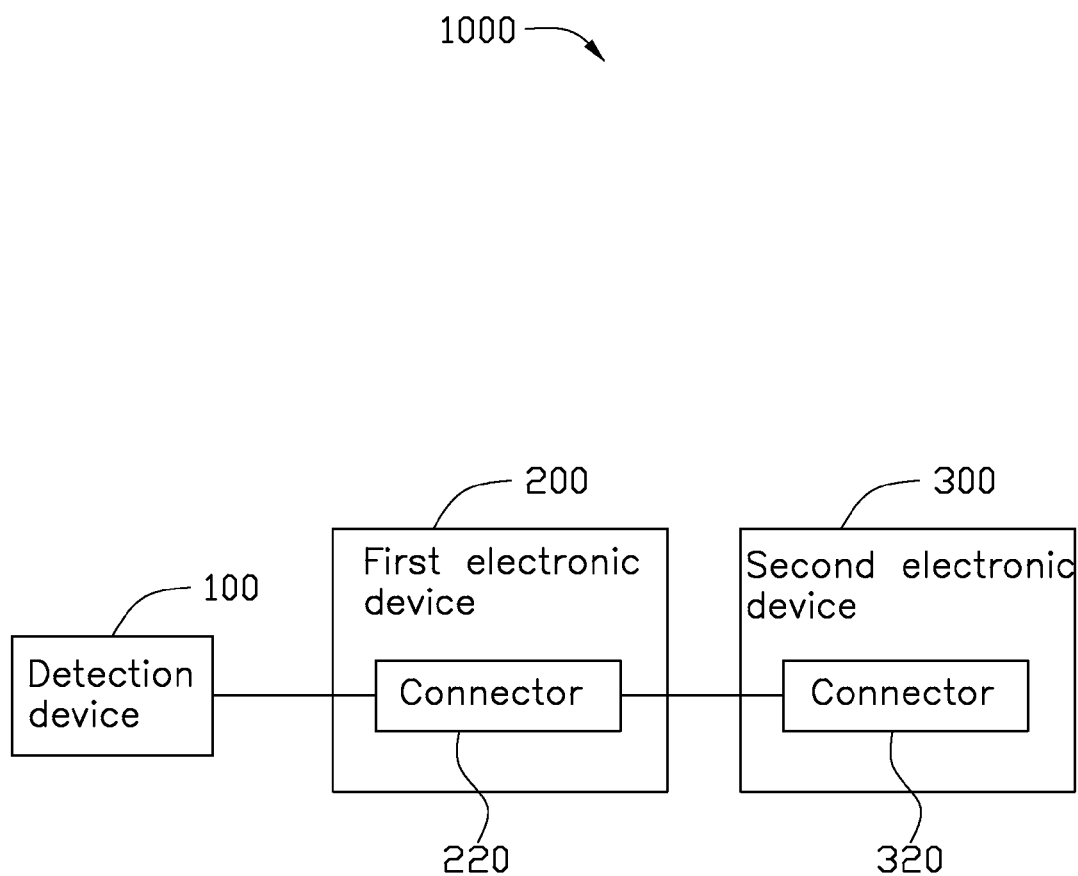
FIG. 1 is a block diagram of an embodiment of a detection system comprising a detection device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure relates to a detection system and a detection device.

FIG. 1 illustrates an exemplary embodiment of a detection system 1000. The detection system 1000 can comprise a detection device 100, a first electronic device 200 and a second electronic device 300. The first electronic device 200 can comprise a first connector 220, and the second electronic device 300 can comprise a second connector 320. The first connector 220 is configured to be electrically coupled to the second connector 320 and the detection device 100. The detection device 100 is configured to detect a connection between the first connector 220 of the first electronic device 200 and the second connector 320 of the second electronic device 300. In at least one embodiment, the first electronic device 200 is a motherboard, the second electronic device 300 is a display, and the first connector 220 and the second connector 320 are both HDMI (High Definition Multimedia Interface) connectors. In other embodiments, the first connector 220 and the second connector 320 can be other interface such as DVI (Digital Visual Interface) or Display Port connectors.

Figure 2:
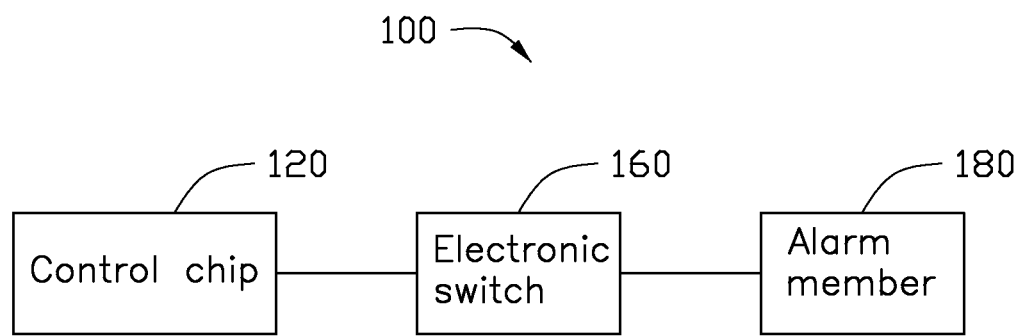
FIG. 2 is a block diagram of the detection device of FIG. 1.
Figure 3:
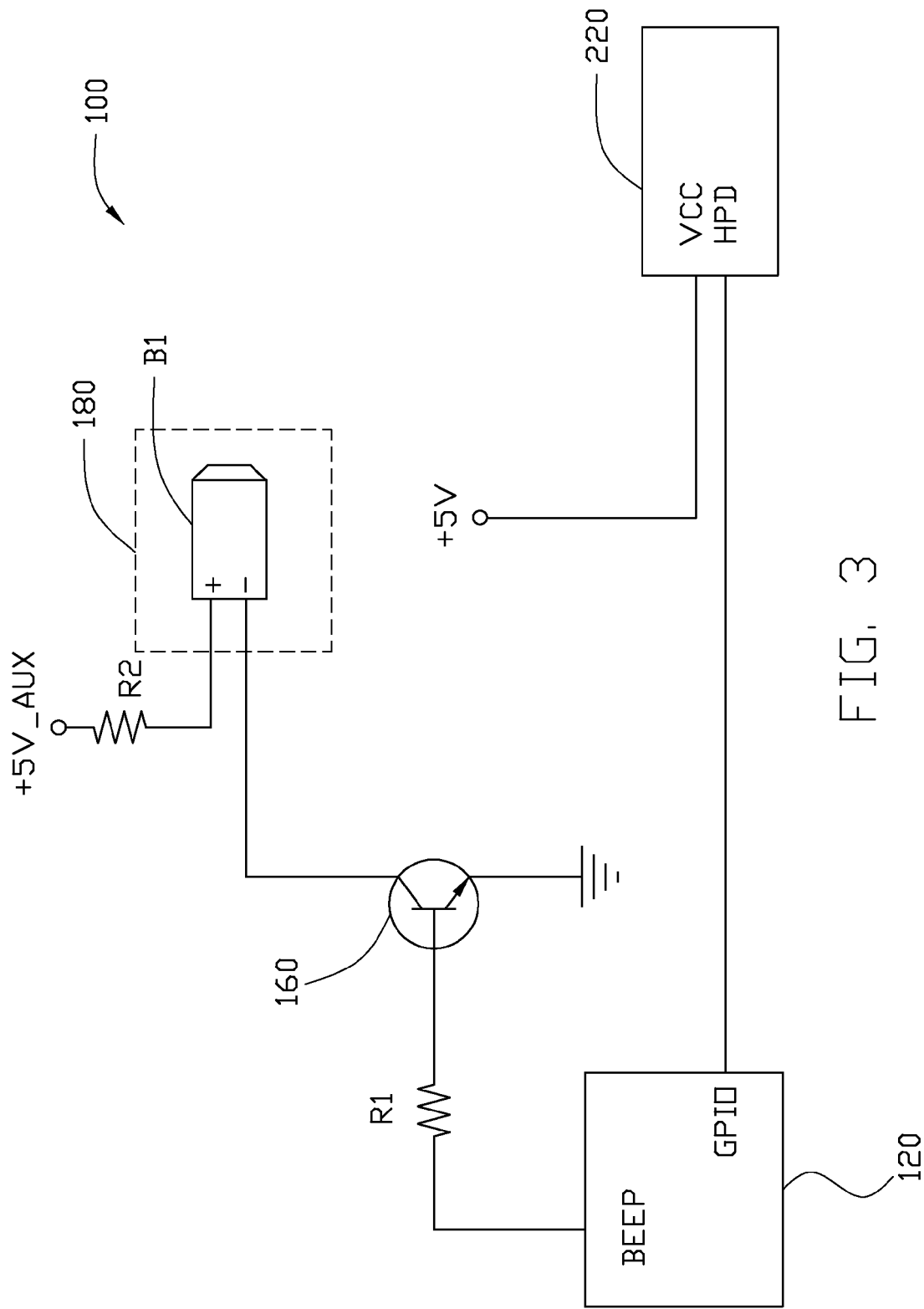
FIG. 3 is a circuit diagram of the detection device of FIG. 1 in a first exemplary embodiment.

FIG. 2 and FIG. 3 illustrate a first exemplary embodiment of a detection device 100. The detection device 100 can comprise a control chip 120, an electronic switch 160, and an alarm member 180. The first connector 220 can comprise a detection pin HPD and a power supply pin VCC. The control chip 120 can comprise an input pin GPIO and an output pin BEEP. The electronic switch 160 can comprise a first terminal, a second terminal, and a third terminal. The alarm member 180 can comprise a first terminal and a second terminal. The input pin GPIO of the control chip 120 is electrically coupled to the detection pin HPD of the first connector 220, when the detection device 100 is configured to detect the connection between the first connector 220 and the second connector 320. The power supply pin VCC of the first connector 220 is electrically coupled to a power supply 5V. The first terminal of the electronic switch 160 is electrically coupled to the output pin BEEP of the control chip 120 through a resistor R1. The second terminal of the electronic switch 160 is electrically coupled to the first terminal of the alarm member 180. The third terminal of the electronic switch 160 is electrically coupled to ground. The second terminal of the alarm member 180 is electrically coupled to a power supply +5V_AUX through a resistor R2.

In present embodiment, the control chip 120 can be a CODEC, the detection pin HPD can be a hot-swap detection pin, the electronic switch 160 can be an NPN-type bipolar junction transistor, and the alarm member 180 can comprise a buzzer B1. The first terminal, the second terminal, and the third terminal of the electronic switch 160 correspond to a base, a collector, and an emitter of the NPN-type bipolar junction transistor. The first terminal and the second terminal of the alarm member 180 correspond to a ground terminal and a power supply terminal of the buzzer B1. In other embodiments, the electronic switch 160 can be an n-channel metal-oxide semiconductor field-effect transistor (NMOS-FET) or other suitable switch having similar functions.

In use, the second connector 320 of the second electronic device 300 is configured to be electrically coupled to the first connector 220 of the first electronic device 200. If the second electronic device 300 operates abnormally, such as a screen of the second electronic device 300 appearing black, the detection device 100 is needed to detect an integrity of the connection between the first connector 220 of the first electronic device 200 and the second connector 320 of the second electronic device 300. If the second electronic device 300 operates normally, the first connector 220 is taken as properly coupled electrically to the second connector 320 and the detection device 100 is not needed.

When the detection device 100 is used to detect the integrity of the connection between the first connector 220 and the second connector 320, the input pin GPIO is electrically coupled to the detection pin HPD of the first connector 220. When the first connector 220 is electrically coupled to second connector 320 properly, the detection pin HPD of the first connector 220 is electrically coupled to the power supply pin VCC in a short circuit. The detection pin HPD outputs a high level signal to the input pin GPIO of the control chip 120, the output pin BEEP of the control chip 120 outputs a low level signal to the first terminal of the electronic switch 160, and the electronic switch 160 is turned off. The second terminal of the alarm member 180 is not electrically coupled to ground, and the alarm member 180 does not operate, indicating a proper connection between the first connector 220 and the second connector 320.

When the first connector 220 is electrically coupled to second connector 320 improperly, the detection pin HPD is disconnected from the power supply pin VCC. The detection pin HPD outputs a low level signal to the input pin GPIO of the control chip 120, the output pin BEEP of the control chip 120 outputs a high level signal to the first terminal of the electronic switch 160, and the electronic switch 160 is turned on. The second terminal of the alarm member 180 is electrically coupled to ground through the electronic switch 160. The alarm member 180 operates and the buzzer B1 sounds, to indicate an improper connection between the first connector 220 and the second connector 320.

Figure 4:
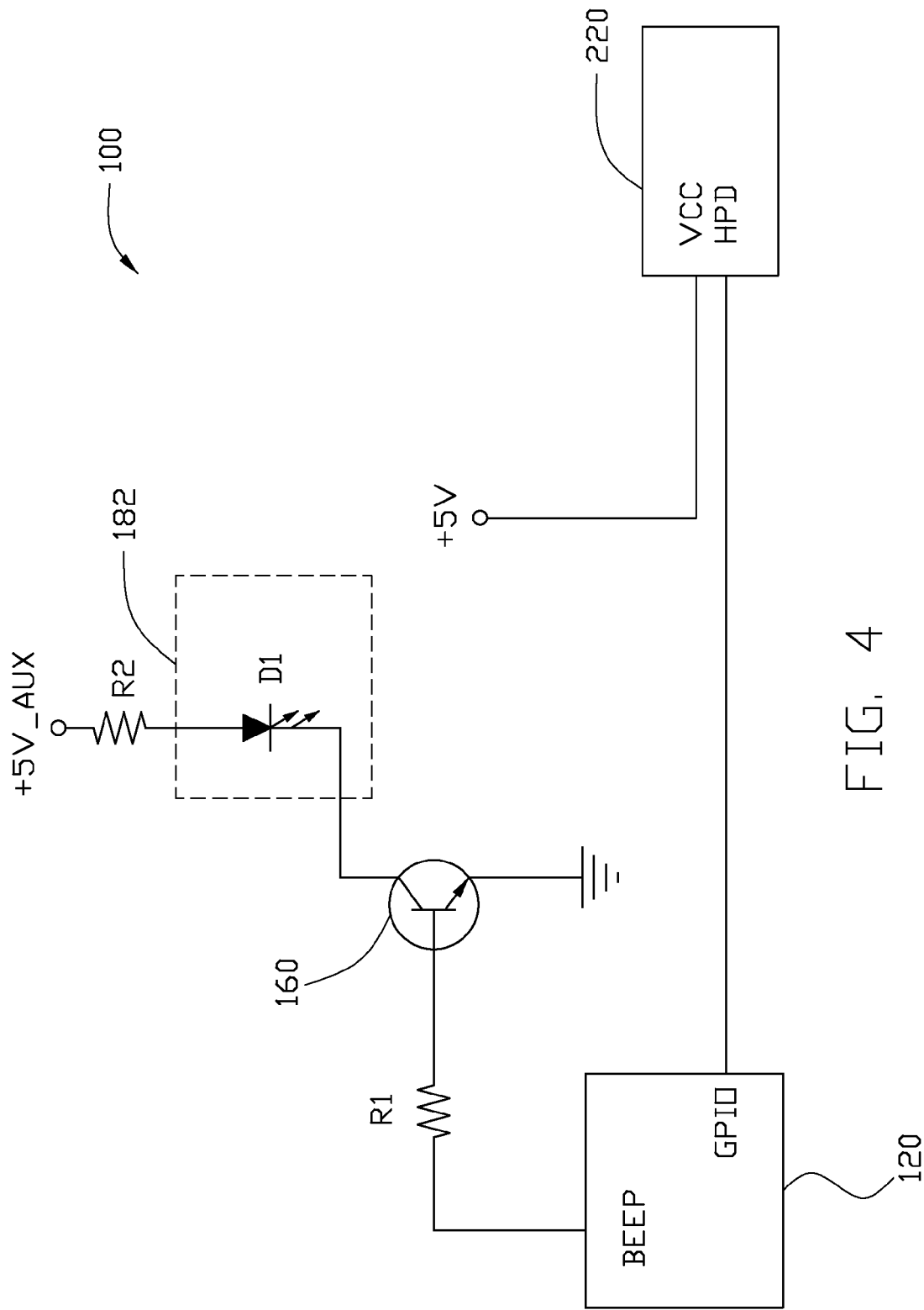
FIG. 4 is a circuit diagram of the detection device of FIG. 1 in a second exemplary embodiment.

FIG. 4 illustrates a second exemplary embodiment of a detection device 100. A difference between the first exemplary embodiment and the second exemplary embodiment is that the alarm member 182 can comprise a light-emitting diode D1. The first terminal and the second terminal of the alarm member 182 correspond to a cathode and an anode of the light-emitting diode D1. When the alarm member 182 operates, the light-emitting diode D1 is illuminated.

Figure 5:
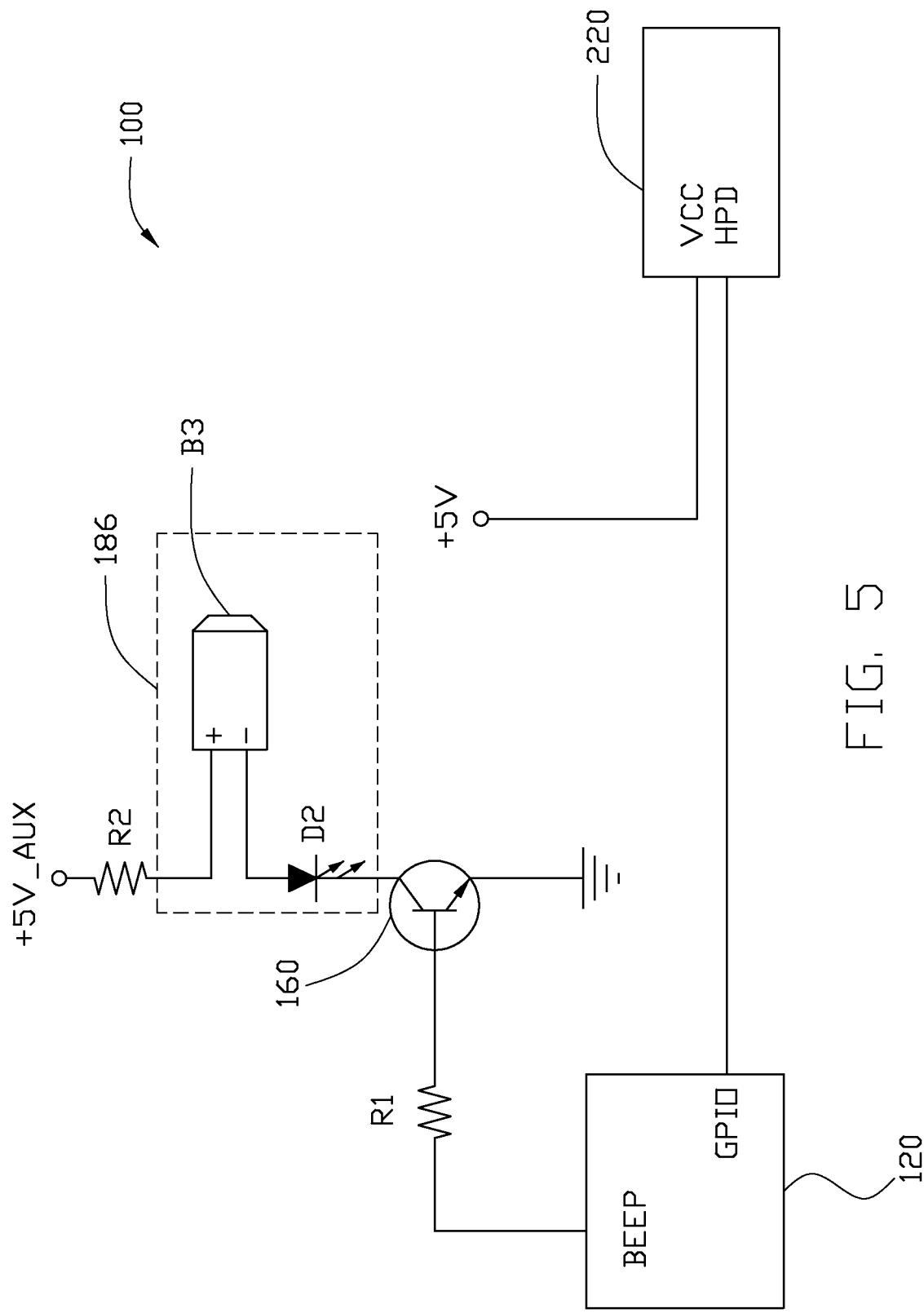
FIG. 5 is a circuit diagram of the detection device of FIG. 1 in a third exemplary embodiment.

FIG. 5 illustrates a third exemplary embodiment of a detection device 100. The difference between the first exemplary embodiment and the third exemplary embodiment is that the alarm member 186 can comprise a buzzer B3 and a light-emitting diode D2. The first terminal and the second terminal of the alarm member 186 correspond to a cathode of the light-emitting diode D2 and a power supply terminal of the buzzer B3. An anode of the light-emitting diode D2 is electrically coupled to a ground terminal of the buzzer B3. When the alarm member 186 operates, the buzzer B3 sounds and the light-emitting diode D2 is simultaneously illuminated.

The embodiments shown and described above are only examples. Even though numerous characteristics and advantages of the present technology have been set forth in the foregoing description, together with details of the structure and function of the present disclosure, the disclosure is illustrative only, and changes may be made in the details, including matters of shape, size, and arrangement of the parts within the principles of the present disclosure, up to and including the full extent established by the broad general meaning of the terms used in the claims.

What is claimed is:

1. A detection device configured to detect a connection between a first connector of a first electronic device and a second connector of a second electronic device, the detection device comprising:
    a control chip;
    an electronic switch electrically coupled to the control chip; and
    an alarm member electrically coupled to the control chip through the electronic switch;
    wherein the control chip is electrically coupled to a detection pin of the first connector in event that the detection device detects that the first connector and the second connector are connected;
    wherein, in event that the first connector is electrically coupled to the second connector properly, the detection pin outputs a first signal to the control chip, the control chip transmits a control to turn off the electronic switch;
    wherein, in event that the first connector is electrically coupled to the second connector improperly, the detection pin outputs a second signal to the control chip, the control chip transmits a control to turn on the electronic switch, thereby enabling the alarm member, which emits an alarm;
    the electronic switch comprises a first terminal, a second terminal and a third terminal, the alarm member comprises a first terminal and a second terminal, the first terminal of the electronic switch is electrically coupled to an output pin of the control chip, the second terminal of the electronic switch is electrically coupled to the first terminal of the alarm member, the third terminal of the electronic switch is electrically coupled to a ground, and the second terminal of the alarm member is electrically coupled to a power supply.

2. The detection device of claim 1, wherein the control chip further comprises an input pin, the output pin is electrically coupled to the electronic switch, the input pin is electrically coupled to the detection pin, in event that the detection device detects the connection between the first connector and the second connector; the detection pin outputs the first signal to the input pin of the control chip, the output pin of the control chip outputs a third signal to the electronic switch, and the electronic switch is turned off, in event that the first connector is electrically coupled to the second connector properly; and the detection pin outputs the second signal to the input pin of the control chip, the output pin of the control chip outputs a fourth signal to the electronic switch, and the electronic switch is turned on, in event that the first connector is electrically coupled to the second connector improperly.

3. The detection device of claim 2, wherein when the output pin outputs the third signal to the first terminal of the electronic switch, the electronic switch is turned off, the second terminal of the alarm member is not electrically coupled to the ground, and the alarm member does not operate; when the output pin outputs the fourth signal to the first terminal of the electronic switch, the electronic switch is turned on, the second terminal of the alarm member is electrically coupled to the ground through the electronic switch, and the alarm member operates.

4. The detection device of claim 3, wherein the electronic switch can be an NPN-type bipolar junction transistor (BJT) or an n-channel metal-oxide semiconductor field-effect transistor (NMOSFET), the first terminal, the second terminal and the third terminal of the electronic switch correspond to a base, a collector and an emitter of the NPN-type bipolar junction transistor or a gate, a drain, and a source of the n-channel metal-oxide semiconductor field-effect transistor.

5. The detection device of claim 3, wherein the alarm member comprises a first buzzer, the first terminal and the second terminal of the alarm member correspond to a grounded terminal and a power supply terminal of the first buzzer, when the alarm member operates, the first buzzer alarms.

6. The detection device of claim 3, wherein the alarm member comprises a first light-emitting diode, the first terminal and the second terminal of the alarm member correspond to a cathode and an anode of the first light-emitting diode, when the alarm member operates, the first light-emitting diode is lit.

7. The detection device of claim 3, wherein the alarm member comprises a second buzzer and a second light-emitting diode, the first terminal and the second terminal of the alarm member correspond to a cathode of the second light-emitting diode and a power supply terminal of the second buzzer, an anode of the second light-emitting diode is electrically coupled to a grounded terminal of the second buzzer, when the alarm member operates, the second buzzer alarms and the second light-emitting diode is lit.

8. A detection system comprising:
a detection device comprising:
a control chip;
an electronic switch electrically coupled to the control chip; and
an alarm member electrically coupled to the electronic switch;
a first electronic device comprising a first connector comprising a detection pin; and
a second electronic device comprising a second connector electrically coupled to the first connector;
wherein the control chip is electrically coupled to a detection pin of the first connector in event that the detection device detects that the first connector and the second connector are connected;
wherein, in event that the first connector is electrically coupled to the second connector properly, the detection pin outputs a first signal to the control chip, the control chip transmits a control to turn off the electronic switch;
wherein, in event that the first connector is electrically coupled to the second connector improperly, the detection pin outputs a second signal to the control chip, the control chip transmits a control to turn on the electronic switch, thereby enabling the alarm member, which emits an the alarm;
the electronic switch comprises a first terminal, a second terminal and a third terminal, the alarm member comprises a first terminal and a second terminal, the first terminal of the electronic switch is electrically coupled to an output pin of the control chip, the second terminal of the electronic switch is electrically coupled to the first terminal of the alarm member, the third terminal of the electronic switch is electrically coupled to a ground, and the second terminal of the alarm member is electrically coupled to a power supply.

9. The detection system of claim 8, wherein the control chip further comprises an input pin, the output pin is electrically coupled to the electronic switch, the input pin is electrically coupled to the detection pin, in event that the detection device detects the connection between the first connector and the second connector; the detection pin outputs the first signal to the input pin of the control chip, the output pin of the control chip outputs a third signal to the electronic switch, and the electronic switch is turned off, in event that the first connector is electrically coupled to the second connector properly; and the detection pin outputs the second signal to the input pin of the control chip, the output pin of the control chip outputs a fourth signal to the electronic switch, and the electronic switch is turned on, in event that the first connector is electrically coupled to the second connector improperly.

10. The detection system of claim 9, wherein when the output pin outputs the third signal to the first terminal of the electronic switch, the electronic switch is turned off, the second terminal of the alarm member is not electrically coupled to the ground, and the alarm member does not operate; when the output pin outputs the fourth signal to the first terminal of the electronic switch, the electronic switch is turned on, the second terminal of the alarm member is electrically coupled to the ground through the electronic switch, and the alarm member operates.

11. The detection system of claim 10, wherein the electronic switch can be an NPN-type bipolar junction transistor (BJT) or an n-channel metal-oxide semiconductor field-effect transistor (NMOSFET), the first terminal, the second terminal and the third terminal of the electronic switch correspond to a base, a collector and an emitter of the NPN-type bipolar junction transistor or a gate, a drain, and a source of the n-channel metal-oxide semiconductor field-effect transistor.

12. The detection system of claim 10, wherein the alarm member comprises a first buzzer, the first terminal and the second terminal of the alarm member correspond to a grounded terminal and a power supply terminal of the first buzzer, when the alarm member operates, the first buzzer alarms.

13. The detection system of claim 10, wherein the alarm member comprises a first light-emitting diode, the first terminal and the second terminal of the alarm member correspond to a cathode and an anode of the first light-emitting diode, when the alarm member operates, the first light-emitting diode is lit.

14. The detection system of claim 10, wherein the alarm member comprises a second buzzer and a second light-emitting diode, the first terminal and the second terminal of the alarm member correspond to a cathode of the second light-emitting diode and a power supply terminal of the second buzzer, an anode of the second light-emitting diode is electrically coupled to a grounded terminal of the second buzzer, when the alarm member operates, the second buzzer alarms and the second light-emitting diode is lit.

* * * * *